(12) United States Patent
Hyon et al.

(10) Patent No.: US 7,877,109 B2
(45) Date of Patent: Jan. 25, 2011

(54) METHOD AND APPARATUS FOR CONTROLLING TRANSMISSION POWER OF COGNITIVE RADIO ENVIRONMENT

(75) Inventors: Tae In Hyon, Hwasaong-si (KR); Jae Myoung Kim, Seoul (KR); Jae Hak Chung, Seoul (KR); Sang Jo Yoo, Incheon (KR); Yang Soo Kwon, Seoul (KR)

(73) Assignees: Samsung Electronics Co., Ltd. (KR); INHA-Industry Partnership Institute (KR)

( * ) Notice: Subject to any disclaimer, the term of this patent is extended or adjusted under 35 U.S.C. 154(b) by 723 days.

(21) Appl. No.: 11/755,277

(22) Filed: May 30, 2007

(65) Prior Publication Data

US 2008/0170539 A1     Jul. 17, 2008

(30) Foreign Application Priority Data

Jan. 11, 2007     (KR) ...................... 10-2007-0003472

(51) Int. Cl.
*H04B 7/00*     (2006.01)
*H04Q 11/12*     (2006.01)
(52) U.S. Cl. ........................ 455/522; 455/69; 455/127.1
(58) Field of Classification Search .............. 455/426.1, 455/426.2, 522, 69, 127.1
See application file for complete search history.

(56) References Cited

U.S. PATENT DOCUMENTS

| | | | |
|---|---|---|---|
| 2006/0193295 A1* | 8/2006 | White et al. | 370/336 |
| 2007/0202867 A1* | 8/2007 | Waltho et al. | 455/423 |
| 2008/0089279 A1* | 4/2008 | Hu et al. | 370/329 |
| 2008/0165680 A1* | 7/2008 | Chang | 370/230 |
| 2008/0165754 A1* | 7/2008 | Hu | 370/342 |
| 2008/0171546 A1* | 7/2008 | Hyon et al. | 455/434 |
| 2008/0198948 A1* | 8/2008 | Tang | 375/316 |
| 2009/0047916 A1* | 2/2009 | Haykin | 455/115.1 |
| 2009/0143008 A1* | 6/2009 | Hottinen et al. | 455/11.1 |

* cited by examiner

*Primary Examiner*—Tilahun Gesesse
(74) *Attorney, Agent, or Firm*—NSIP Law

(57) ABSTRACT

A method and apparatus of controlling a transmission power of a cognitive radio (CR) environment, the method including: sensing an incumbent user that uses a same channel as the CR environment; detecting signal quality information of the sensed incumbent user; calculating, using the detected signal quality information, a maximum transmission power value that corresponds to a maximum transmission power that may be transmitted by a CR base station in the CR environment; and controlling a communication of the CR environment to be performed within the calculated maximum transmission power value.

25 Claims, 10 Drawing Sheets

US 7,877,109 B2

METHOD AND APPARATUS FOR CONTROLLING TRANSMISSION POWER OF COGNITIVE RADIO ENVIRONMENT

CROSS-REFERENCE TO RELATED APPLICATION

This application claims the benefit of Korean Application No. 2007-3472, filed Jan. 11, 2007 in the Korean Intellectual Property Office, the disclosure of which is incorporated herein by reference.

BACKGROUND OF THE INVENTION

1. Field of the Invention

Aspects of the present invention relate to a cognitive radio (CR) environment, and more particularly, to a method and apparatus for controlling a transmission power of a CR environment.

2. Description of the Related Art

Due to the rapid development of wireless communication technologies, wireless communication systems are currently required to obtain and maintain their own frequency band to overcome disadvantages resulting from the coexistence of a plurality of systems. However, frequency resources for new wireless communication systems are virtually exhausted since most frequency bands that are actually available are already assigned according to government policy. That is, according to current frequency assignments, frequency bands from Hz to GHz are all being used, leaving no frequency bands that may additionally be used.

Cognitive radio (CR) technology is currently being discussed to overcome such radio resource shortages. In CR technology, radio resources with a low utilization ratio are identified and then shared without interfering with systems that use existing assigned frequencies. Accordingly, radio resource efficiencies are theoretically improved.

Cost efficiency is one of the advantages of CR technologies. Specifically, compared to existing wireless communication services, CR technologies are relatively low priced by using wireless frequency bands with no charge. CR technologies are related to the management and distribution of wireless channels with respect to multi-channels and to interference detection technologies, which may be interoperable with next generation wireless communication. As an example, CR technologies may efficiently transmit high speed data in dead zones without generating frequency interferences. In this instance, the dead zones are created in cellular environments or rural areas required to improve cell sizes.

FIG. 1 is a diagram illustrating an example of a conventional CR environment. Referring to FIG. 1, a signal process operation in an existing CR environment 100 where an incumbent user 152 exists is described. An incumbent user 152 is a priority and/or previous user of a frequency utilized in the existing CR environment 100.

As illustrated in FIG. 1, a single CR base station 101 and a plurality of CR users 102, 103, 104, 105, 106, 107, 108, 109, and 110, which communicate using a CR technology, control a communication to be performed by using given radio frequency resources (e.g. channel 1, channel 2, channel 3, etc.). Accordingly, the CR base station 101 divides and manages a wireless communication network. The CR users 102, 103, 104, 105, 106, 107, 108, 109, and 110 are referred to as customer premises equipment (CPE). Two of the CR users 102 and 103 that use the channel 1 may use channel 1 in a same frequency band by separating channel 1 in terms of time based on an orthogonal frequency division multiple access (OFDMA). In this case, when an incumbent user 152 that uses channel 1 in the same frequency band exists around the CR user 102 in the communication area of the CR environment 100 and communicates with an incumbent base station 151, the CR user 102 is required to not interfere with the incumbent user 152. Accordingly, the CR user 102 is required to vacate a frequency band of channel 1 that is being used.

FIG. 2 is a diagram illustrating an example of an environment of a general wireless communication system. Referring to FIG. 2, a case where a wireless communication user that uses a same frequency band in an environment of at least two conventional wireless communication systems exists is described. It is understood that a wireless communication system described in FIG. 2 may be, for example, a communication system of a CR environment.

As illustrated in FIG. 2, the at least two wireless communication systems using the same frequency band may exist. Two wireless communication base stations 201 and 251 exist and control communication areas 200 and 250, respectively. A signal transmitted by the wireless communication base station 201 or 251 is received by the wireless communication user. A maximum distance that is decodable at all times is a protected zone 204. An interference power, which is predictable or unpredictable, may be received in the environment of the wireless communication system. Accordingly, considering a zone 205 for a particular signal-to-noise ratio, a decodable zone 203 with respect to a signal received from a wireless communication base station may be divided. That is, when the wireless communication user is located in the protected zone 204, the signal received from the wireless communication base station 201 may be decodable at all times. However, when the wireless communication user is located in the decodable zone 203, the signal received from the wireless communication base station 201 may or may not be decodable due to an effect of interference.

In the wireless communication system environments, when a same radio resource (i.e., another wireless communication user communicating with the wireless communication base station that uses a same frequency band) exists, a common communication area 210 is generated. The common communication area 210 is between areas controlled by the two wireless communication base stations 201 and 251. In this instance, a co-channel interference or radio interference may occur in two wireless communication users 202 and 252, while receiving a signal received from the two wireless communication base stations 201 and 251.

A communication method and apparatus of a conventional CR environment has the following disadvantages. First, in the conventional CR environment, when an incumbent user exists, CR users that do not cause a channel interference may not use a channel that the incumbent user uses. For example, as illustrated in FIG. 1, when the incumbent user 152 exists, the two CR users 103 and 104 may not use the channel 1 even though the two CR users 103 and 104 do not interfere with the incumbent user 152. Second, in the conventional CR environment, a channel change frequently occurs due to the existence of an incumbent user, which causes a communication time delay and a system instability.

Accordingly, a method and apparatus for controlling a transmission power of a CR environment is needed.

SUMMARY OF THE INVENTION

Aspects of the present invention provide a method and apparatus for controlling a transmission power of a cognitive radio (CR) environment that may share a radio resource by changing a channel of only a few CR users even when an incumbent user that uses a same channel in the CR environment exists. Aspects of the present invention also provide a method and apparatus for controlling a transmission power in a CR environment that may reduce a number of channel changes by individually controlling a plurality of CR users that use a same channel in the CR environment as that of an incumbent user.

According to an aspect of the present invention, there is provided a method of controlling a transmission power of a cognitive radio (CR) environment, the method including: sensing an incumbent user that uses a same channel as the CR environment; detecting signal quality information of the sensed incumbent user; calculating, using the detected signal quality information, a maximum transmission power value that corresponds to a maximum transmission power that may be transmitted by a CR base station in the CR environment; and controlling a communication of the CR environment to be performed according to the calculated maximum transmission power value.

According to another aspect of the present invention, there is provided an apparatus for controlling a transmission power of a CR environment, the apparatus including: a sensing unit to sense an incumbent user that uses a same channel as the CR environment; a detection unit to detect signal quality information of the sensed incumbent user; a calculation unit to calculate, using the detected signal quality information, a maximum transmission power value that corresponds to a maximum transmission power that may be transmitted by a CR base station in the CR environment; and a control unit to control a communication of the CR environment to be performed according to the calculated maximum transmission power value.

According to still another aspect of the present invention, there is provided a CR user that communicates with a CR base station in a CR environment, the CR user including: a sensing unit to sense an incumbent user that uses a same channel as the CR environment; a detection unit to detect signal quality information of the sensed incumbent user; and a transmission unit to transmit the detected signal quality information to the CR base station of the CR environment.

According to yet another aspect of the present invention, there is provided a CR base station that communicates with a CR user in a CR environment, the CR base station including: a receiving unit to receive signal quality information, detected by the CR user, of an incumbent user; a calculation unit to calculate a maximum transmission power value that may be transmitted by the CR base station in the CR environment by using the received signal quality information of the incumbent user; and a control unit to control a communication of the CR environment to be performed according to the calculated maximum transmission power value.

According to another aspect of the present invention, there is provided a method of controlling a transmission power of a CR environment, the method including: sensing an incumbent user that uses a same channel as the CR environment; calculating a maximum transmission power value that corresponds to a maximum transmission power that may be transmitted by a CR base station in the CR environment without causing an inadmissible interference for the incumbent user; and controlling a communication of the CR environment to be performed according to the calculated maximum transmission power value.

According to another aspect of the present invention, there is provided a method of determining a transmission power of a CR environment, the method including: obtaining signal quality information of an incumbent user that uses a same channel as the CR environment; and calculating, using the signal quality information, a maximum transmission power value that corresponds to a maximum transmission power that may be transmitted by a CR base station in the CR environment.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
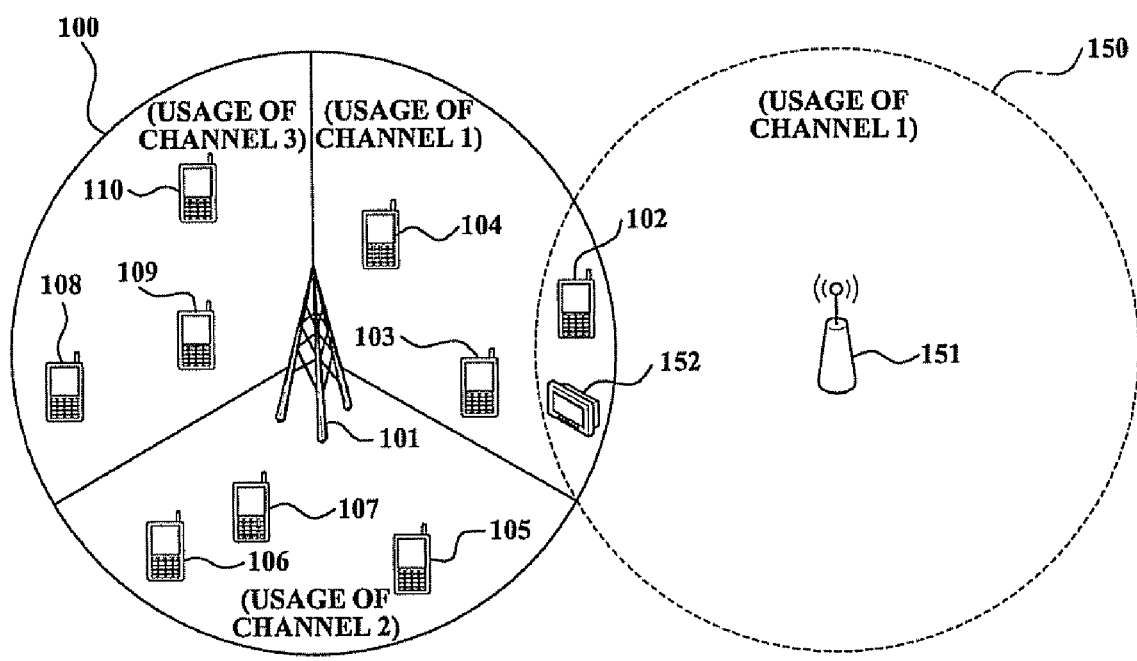
FIG. 1 is a diagram illustrating a conventional CR environment.
Figure 2:
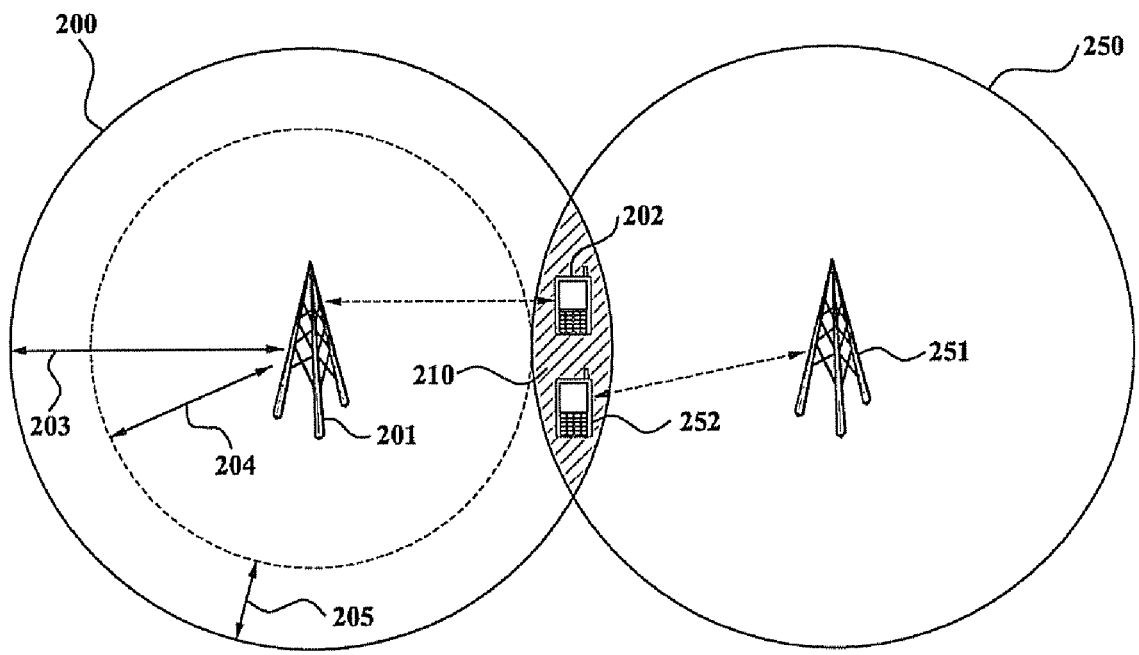
FIG. 2 is a diagram illustrating an environment of a general wireless communication system.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 3:
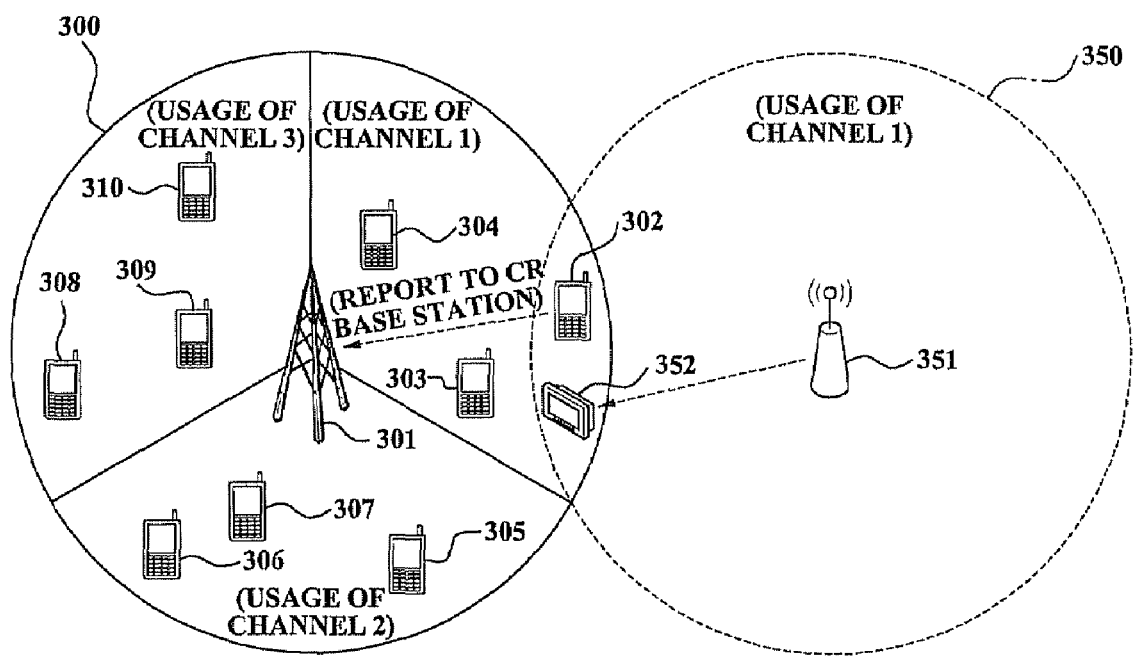
FIG. 3 is a diagram illustrating an apparatus for controlling a transmission power of a CR environment according to an embodiment of the present invention.

FIG. 3 is a diagram illustrating an apparatus for controlling a transmission power of a CR environment according to an embodiment of the present invention. Referring to FIG. 3, an operation of reporting whether an incumbent user exists to a cognitive radio (CR) base station by a CR user of a system for controlling a transmission power of a CR environment, according to an embodiment of the present invention, is described.

In a CR technology, although a frequency band is assigned, the frequency band may not actually be used. Thus, the frequency band may be empty. The empty frequency band is sensed so as to be efficiently shared in the CR technology. An interference temperature limit (ITL) is a maximum level of a sum of an existing signal power and an interference signal power that still allows an environment capable of decoding an existing signal. A CR base station 301 is an apparatus to transmit to/receive from one or more types of terminals via a wireless interface, and to control a communication performed in the CR base station's 301 own communication areas 300. A CR user 302, 303, 304, 305, 306, 307, 308, 309, and 310 is a terminal that is capable of wirelessly communicating with the CR base station 301, enabling the terminal to be connected to a transmission channel of a public communication provider. The CR user 302, 303, 304, 305, 306, 307, 308, 309, and 310 may be referred to as a customer premises equipment (CPE). A primary system is a wireless communication system that lawfully uses, or has a right to use, a frequency. An incumbent base station 351 is a base station of the primary system, and the incumbent user 352 is a terminal of the primary system. An uplink is a communication from a user/terminal to a base station, and a downlink is a communication from the base station to the user/terminal.

As illustrated in FIG. 3, a CR base station 301 divides a communication area 300 of the CR environment into three sectors, manages the communication area 300, and controls a power for each sector. CR users 302, 303, 304, 305, 306, 307, 308, 309, and 310 belong to the CR base station 301 to perform a wireless communication. Each sector uses one frequency band (e.g., channel 1, channel 2, and channel 3, respectively). While using the frequency band, when an incumbent base station 351 and an incumbent user 352 of a communication area 350 start communicating via channel 1, the CR user 302 senses a signal during a silent period in order to not interfere with the incumbent user 352, since the CR user 302 also uses channel 1. The CR user 302 also reports the sensing of the signal to the CR base station 301 via an existing communication network.

Figure 4A:
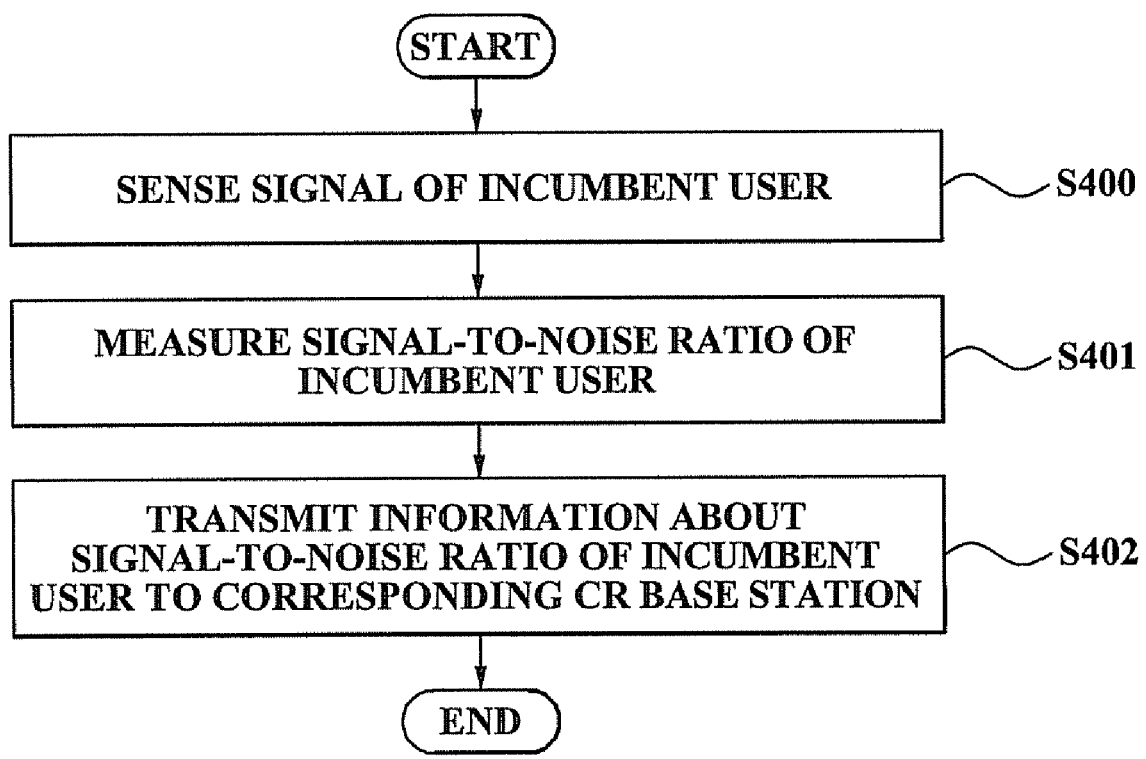
FIG. 4A is a flowchart illustrating a method of controlling a transmission power of a CR environment according to an embodiment of the present invention.

FIG. 4A is a flowchart illustrating a method of controlling a transmission power of a CR environment according to an embodiment of the present invention. Referring to FIG. 4A, an operation of sensing an incumbent user by a CR user of the CR environment is described.

In operation S400, the CR user of the CR environment, according to an embodiment of the present invention, senses a signal of the incumbent user using a same channel during a silent period. When the signal is sensed, the incumbent user is recognized (operation S400). In operation S401, the CR user measures a signal-to-noise ratio (SNR) of the incumbent user. In operation S402, the CR user transmits the SNR of the incumbent user to a corresponding CR base station via an uplink. However, it is understood that according to aspects of the present invention, other methods of obtaining signal quality information of the incumbent user, other than the measuring the SNR of the incumbent user, may be applied. That is, the SNR is described as a non-limiting example of the signal quality information of the incumbent user. Specifically, the CR environment may actively sense an operation status of another wireless communication system. Through the sensed operation status, a system using a CR technology may confirm a type of an authorized primary system and a distance from the incumbent base station when a frequency use by the primary system is sensed.

Figure 4B:
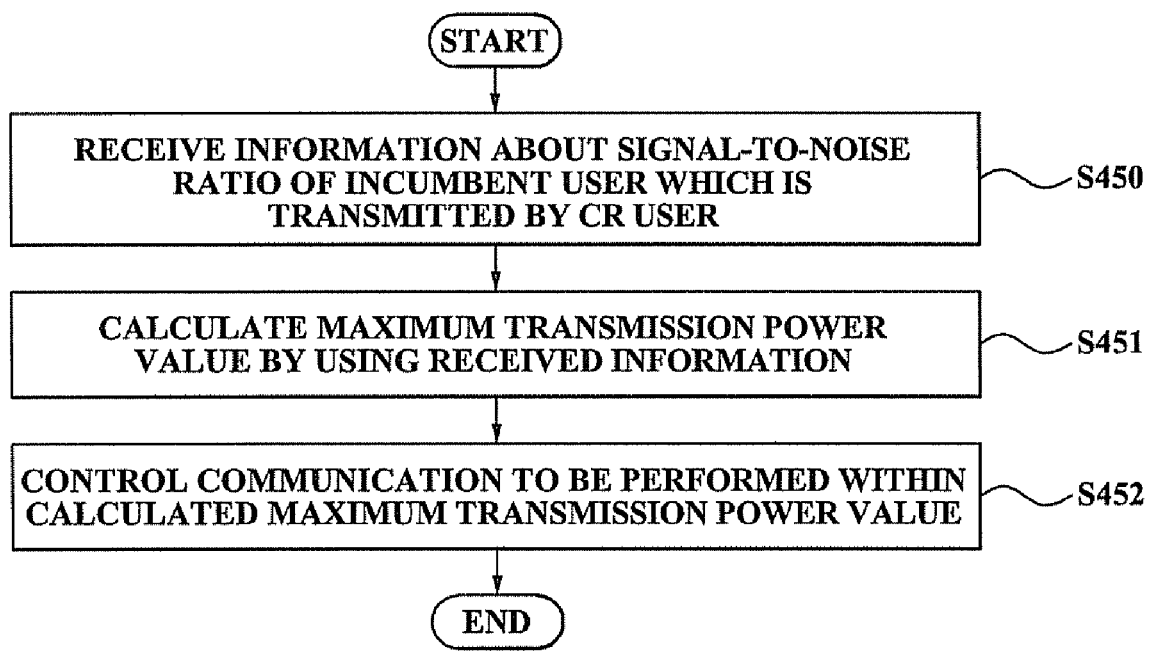
FIG. 4B is a flowchart illustrating a method of controlling a transmission power of a CR environment according to another embodiment of the present invention.

FIG. 4B is a flowchart illustrating a method of controlling a transmission power of a CR environment according to another embodiment of the present invention. Referring to FIG. 4B, an operation of calculating a maximum transmission power by a CR base station of the CR environment, according to an embodiment of the present invention, is described.

In operation S450, the CR base station receives SNR information of an incumbent user. The SNR information of the incumbent user is transmitted from a CR user. In operation S451, the CR base station calculates a maximum transmission power value that provides an admissible amount of interference to the incumbent user. The calculating of the maximum transmission power is described in greater detail with reference to FIG. 5. In operation S452, the CR base station controls a communication to be performed within the calculated maximum transmission power value. However, it is understood that according to other aspects, the base station may control the communication to be performed according to, but not within, the calculated maximum transmission power. For example, the base station may allow a slightly higher amount of interference than desired by the incumbent user according to the calculated maximum transmission power.

Figure 5:
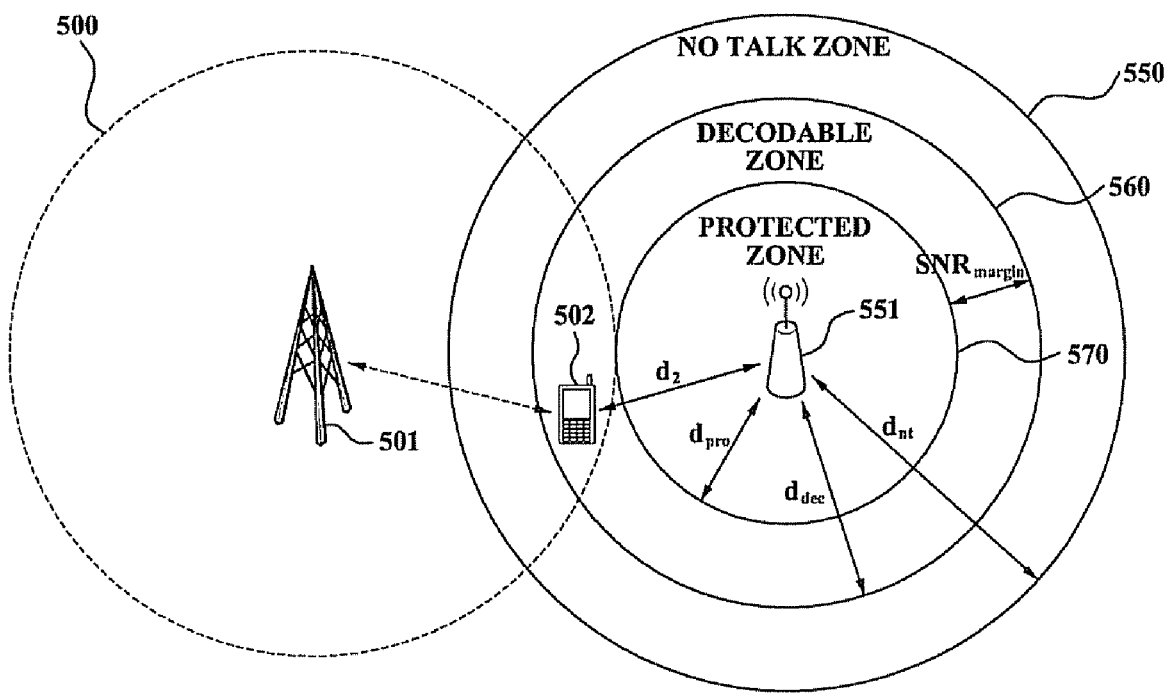
FIG. 5 is a diagram illustrating a system for controlling a transmission power of a CR environment according to an embodiment of the present invention.

FIG. 5 is a diagram illustrating a system for controlling a transmission power of a CR environment according to an embodiment of the present invention. Referring to FIG. 5, the calculating of the maximum transmission power is described.

A CR base station 501 has information about a transmission power value of an incumbent base station 551 (denoted by $P_1$), a transmission power of the CR base station 501 (denoted by $P_2$), a noise power of the incumbent base station 551 (denoted by $\sigma_1^2$), a noise power of the CR base station (denoted by $\sigma_2^2$), a path loss model from the incumbent base station 551 to a protected zone 570 (denoted by $d_{pro}^{-\alpha_1}$), a path loss model from the incumbent base station 551 to a CR user 502 (denoted by $d_2^{-\alpha_2}$), and an SNR of a decodable zone 560 (denoted by $\Gamma_{dec}$). To guarantee a signal decoding of the incumbent user, the SNR of the incumbent user must be greater than or equal to the SNR of the decodable zone 560 ($\Gamma_{dec}$), as shown in Equation 1:

$$\frac{P_1 d_{pro}^{-\alpha_1}}{P_2 d_2^{-\alpha_2} + \sigma_1^2} \geq 10^{\frac{\Gamma_{dec}}{10}} \qquad \text{[Equation 1]}$$

With respect to $P_2$, Equation 1 is arranged as:

$$P_2 \leq \left(P_1 d_{pro}^{-\alpha_1} 10^{\frac{-\Gamma_{dec}}{10}} - \sigma_1^2\right) d_2^{\alpha_2} \qquad \text{[Equation 2]}$$

Also, in Equation 2, an SNR of a boundary of the protected zone 570 of the incumbent user is a sum of the SNR of the decodable zone 560 ($\Gamma_{dec}$), and a difference $SNR_{margin}$ between an SNR of a boundary of the decodable zone 560, based on the incumbent base station 551, and an SNR of a boundary of the protected zone 570, based on the incumbent base station 551. The SNR of the boundary of the protected zone 570 of the incumbent user is represented by:

$$10\log\left(\frac{P_1 d_{pro}^{-\alpha_1}}{\sigma_1^2}\right) = \Gamma_{dec} + SNR_{margin}. \qquad \text{[Equation 3]}$$

In this instance, with respect to $P_1 d_{pro}^{-\alpha_1}$, Equation 3 is arranged as:

$$P_1 d_{pro}^{-\alpha_1} = \sigma_1^2 10^{\frac{\Gamma_{dec} + SNR_{margin}}{10}}. \qquad \text{[Equation 4]}$$

To calculate the transmission power of the CR base station 501 ($P_2$), when making substitutions of Equation 4 with respect to Equation 2, Equation 4 is arranged as:

$$P_2 \leq \left(10^{\frac{SNR_{margin}}{10}} - 1\right)\sigma_1^2 d_2^{\alpha_2}. \quad \text{[Equation 5]}$$

Accordingly, the CR base station 501 calculates a maximum transmission power value considering an interference power limit or an interference temperature limit (ITL) according to Equation 5. Also, the CR base station 501 obtains a power of a CR base station for an incumbent user of a corresponding sector by using the calculated maximum value.

Figure 6:
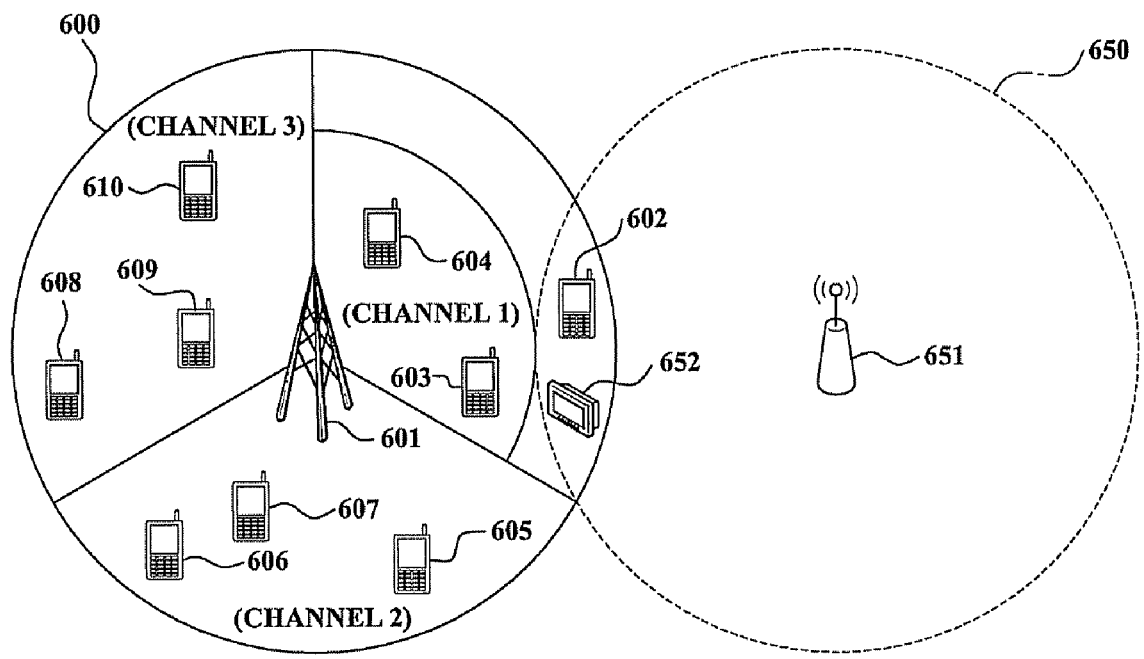
FIG. 6 is a diagram illustrating a system for controlling a transmission power of a CR environment according to another embodiment of the present invention.

FIG. 6 is a diagram illustrating a system for controlling a transmission power of a CR environment according to another embodiment of the present invention. Referring to FIG. 6, in the system for controlling a transmission power of a CR environment, setting a different transmission power for each sector is described.

As illustrated in FIG. 6, a CR base station 601 manages a communication area 600 of the CR environment and divides the communication area 600 into three sectors. It is understood that the dividing of the communication area 600 into three sectors is a non-limiting example, and the communication area 600 can be divided into more or less sectors in other aspects of the present invention. CR users 602, 603, 604, 605, 606, 607, 608, 609, and 610 belong to the CR base station 601 to communicate. The CR users 602, 603, and 604 use channel 1, the CR users 605, 606, and 607 use channel 2, the CR users 608, 609, and 610 use channel 3.

When an incumbent user 652, which is located adjacent to the CR user 602 and uses a same frequency, attempts to communicate with an incumbent base station 651, the CR user 602 recognizes the communication and reports the communication to the CR base station 601. The CR base station 601 controls a transmission power by using a method described above with reference to FIGS. 3 through 5. However, a transmission power of the entire communication area 600 of the CR environment is not controlled. Rather, only transmission power of a single sector of the communication area 600 using the channel 1, which interferes with the incumbent user 652, is controlled. Accordingly, a communication area of a corresponding sector is relatively reduced. However, a use of the channel 1 within an admissible interference range may be maintained. Accordingly, the CR users 603 and 604 outside of the interference range in a same sector may maintain communication without changing a channel, and also maintain a similar throughput as another sector with a normal or full transmission power.

Figure 7:
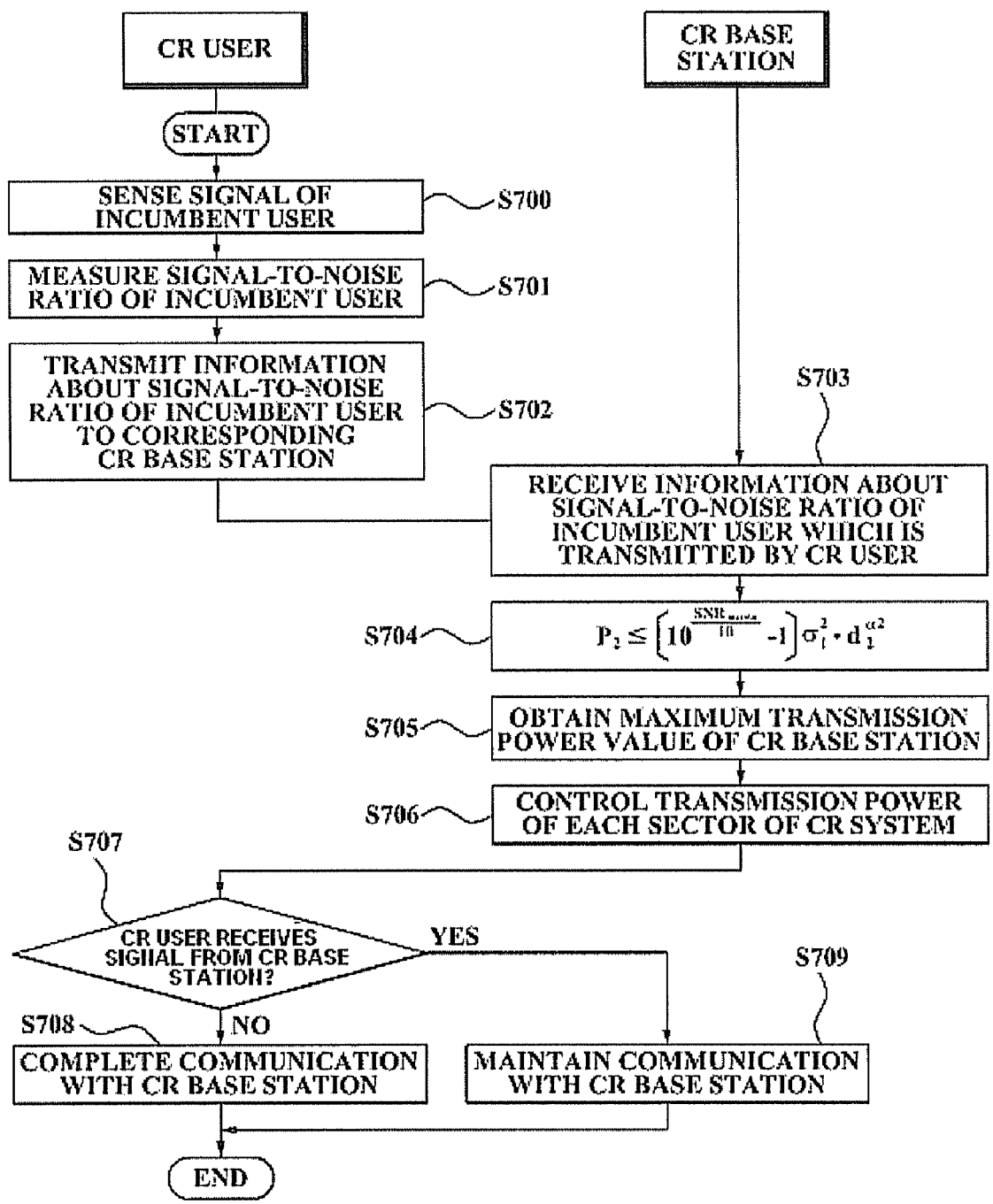
FIG. 7 is a flowchart illustrating a method of controlling a transmission power of a CR environment according to another embodiment of the present invention.

FIG. 7 is a flowchart illustrating a method of controlling a transmission power of a CR environment according to another embodiment of the present invention. Referring to FIG. 7, an operation of partially controlling the transmission power of the CR environment by a CR user and a CR base station is described.

As illustrated in FIG. 7, when an incumbent user using a same frequency as a CR user exists while the CR user using a CR technology communicates with the CR base station, the CR user senses a signal of the incumbent user to recognize an existence of the incumbent user (operation S700). In operation S701, an SNR of the incumbent user is measured. However, it is understood that according to aspects of the present invention, other methods of obtaining signal quality information of the incumbent user, other than the measuring the SNR of the incumbent user, may be applied. In operation S702, information about the existence of the incumbent user is reported to a corresponding CR base station. The reported information may include the SNR of the incumbent user.

In operation S703, the CR base station receives the SNR information from the CR user. In operation S704, a transmission power of the CR base station (denoted as $P_2$) is calculated according to Equation 5 described above by using the received information. In operation S705, the maximum transmission power value of the CR base station (denoted as $P_2$) is obtained. In operation S706, the CR base station controls a transmission power of each sector of a CR system by using the obtained result. In this instance, the CR base station forms, with the controlled transmission power, a downlink to the CR user via a same radio resource as the incumbent user. However, the transmission power of the CR base station is reduced. As a result, the CR user located around a communication area of the CR environment may not be able to communicate.

Accordingly, the CR user transmitting the information about the incumbent user to the CR base station waits until receiving a signal of the CR base station in operation S707. When the signal of the CR base station is received, the CR user maintains a communication with the CR base station in operation S709. When the signal of the CR base station is not received, the CR user either ends the communication with the CR base station, or attempts to retrieve another channel by searching for an available frequency band in operation S708.

Figure 8A:
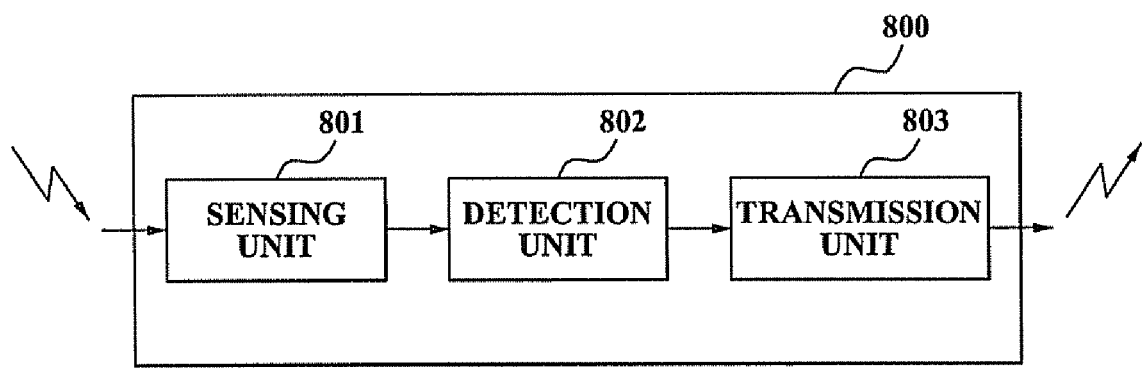
FIG. 8A is a block diagram illustrating a configuration of a CR user of a CR environment according to an embodiment of the present invention.

FIG. 8A is a block diagram illustrating a configuration of a CR user of a CR environment according to an embodiment of the present invention. Referring to FIG. 8A, the configuration of the CR user of the CR environment is described. However, it is understood that the configuration illustrated in FIG. 8A is non-limiting, and according to aspects of the present invention other configurations may be applied according to the descriptions with reference to FIGS. 3 through 7.

As illustrated in FIG. 8A, a CR user 800 may include a sensing unit 801, a detection unit 802, and a transmission unit 803. The CR user 800 may be a terminal, a cellular phone, a CPE, etc. The sensing unit 801 senses an incumbent user that uses a same channel as the CR environment. The detection unit 802 detects and/or measures an SNR of the incumbent user when the incumbent user is sensed. The transmission unit 803 transmits the detected and/or measured SNR of the incumbent user to a CR base station of the CR environment.

Figure 8B:
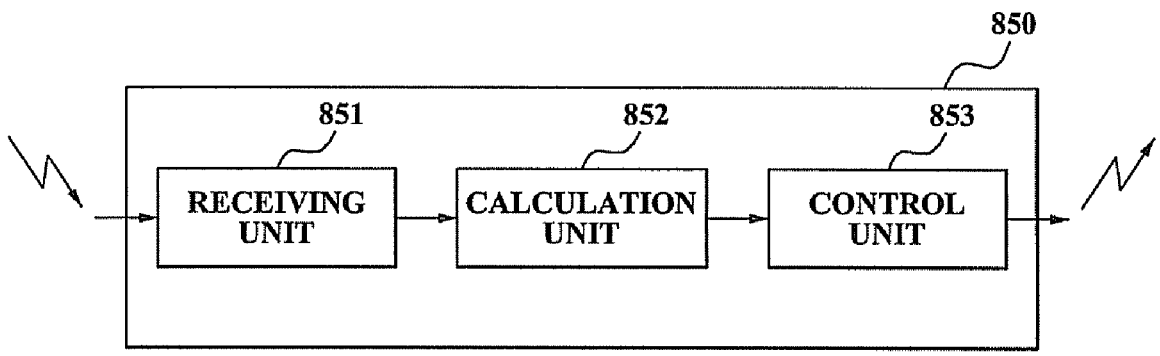
FIG. 8B is a block diagram illustrating a configuration of a CR base station of a CR environment according to an embodiment of the present invention.

FIG. 8B is a block diagram illustrating a configuration of a CR base station of a CR environment according to an embodiment of the present invention. Hereinafter, referring to FIG. 8B, the configuration of the CR base station of the CR environment is described. However, it is understood that the configuration illustrated in FIG. 8A is non-limiting, and according to aspects of the present invention other configurations may be applied according to the descriptions with reference to FIGS. 3 through 7

As illustrated in FIG. 8B, the CR base station 850 includes a receiving unit 851, a calculation unit 852, and a control unit 853. The receiving unit 851 receives an SNR of an incumbent user. According to aspects of the present invention, the SNR is detected by a CR user. The calculation unit 852 calculates a maximum transmission power value that may be transmitted in the CR base station of the CR environment by using the received SNR of the incumbent user. The control unit 853 controls a communication of the CR environment to be performed within the calculated maximum transmission power value.

Specifically, according to aspects of the present invention, when the incumbent user using a radio frequency band exists, a transmission power of the CR base station is controlled. In this case, a wireless communication system utilizing a CR technology uses the radio frequency band. Accordingly, the wireless communication system utilizing the CR technology may continuously use a same frequency band within an interference range that does not cause interference for the incumbent user.

A method and apparatus for controlling a transmission power of a CR environment, according to the above-described aspects of the present invention, maintains a use of a wireless channel in the CR environment when an incumbent user using the same wireless channel exists, and thereby efficiently using a radio resource.

Also, a method and apparatus for controlling a transmission power of a CR environment, according to the above-described aspects of the present invention, may guarantee continuity and stability of a communication. As an example, a CR user efficiently recognizes an incumbent user of a same frequency band, and satisfies an ITL even when the incumbent user exists. Moreover, a CR user using the same frequency band is not required to change a frequency band, and thereby may maintain a continuous communication.

Furthermore, a method and apparatus for controlling a transmission power of a CR environment, according to the above-described aspects of the present invention, improve an entire throughput in a CR system area. As an example, a CR user reports a transmission power of an incumbent user to a CR base station that calculates a maximum transmission power value according to a noise power information of the incumbent user or a noise power information of the CR user. Accordingly, sector-specific control of a corresponding sector, by using the calculated maximum transmission power value, may be performed.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of controlling a transmission power of a cognitive radio (CR) environment, the method comprising:
sensing an incumbent user that uses a same channel as the CR environment;
detecting signal quality information of the sensed incumbent user;
calculating, using the detected signal quality information, a maximum transmission power value that corresponds to a maximum transmission power that may be used by a CR base station in the CR environment; and
controlling a communication of the CR environment to be performed according to the calculated maximum transmission power value.

2. The method as claimed in claim 1, wherein the controlling of the communication comprises:
dividing the CR environment into a first sector that uses a first channel and a second sector that uses a second channel;
controlling the communication of the CR environment to be performed within the calculated maximum transmission power value in the first sector only when the first channel is the same channel used by the incumbent user; and
controlling the communication of the CR environment to be performed within the calculated maximum transmission power value in the second sector only when the second channel is the same channel used by the incumbent user.

3. The method as claimed in claim 1, further comprising:
transmitting the detected signal quality information of the sensed incumbent user by a CR user of the CR environment.

4. The method as claimed in claim 1, wherein the calculating of the maximum transmission power value comprises:
calculating the maximum transmission power value according to an equation:

$$P \leq \left(10^{\frac{SNR_{margin}}{10}} - 1\right)\sigma_1^2 d_2^{\alpha_2},$$

where $SNR_{margin}$ is a difference between a signal-to-noise ratio in a boundary area of a decodable zone based on an incumbent base station and a signal-to-noise ratio in a boundary area of a protected zone based on the incumbent base station, $\sigma_1^2$ is a noise power of the incumbent base station, and $d_2^{-\alpha_2}$ is a path loss function from the incumbent base station to a CR user.

5. The method as claimed in claim 1, wherein the controlling of the communication comprises:
controlling the communication of the CR environment to be performed within the calculated maximum transmission power value.

6. The method as claimed in claim 1, wherein the signal quality information is a signal-to-noise ratio.

7. The method as claimed in claim 1, wherein the detecting of the signal quality information comprises:
measuring a signal quality of the sensed incumbent user.

8. The method as claimed in claim 1, wherein the controlling of the communication comprises:
ending a communication of a CR user with the CR base station when the CR user does not receive a signal from the CR base station.

9. The method as claimed in claim 1, wherein the controlling of the communication comprises:
attempting to retrieve another channel, different from the same channel used by the incumbent user, for a CR user when the CR user does not receive a signal from the CR base station.

10. An apparatus for controlling a transmission power of a CR environment, the apparatus comprising:
a sensing unit to sense an incumbent user that uses a same channel as the CR environment;
a detection unit to detect signal quality information of the sensed incumbent user;
a calculation unit to calculate, using the detected signal quality information, a maximum transmission power value that corresponds to a maximum transmission power that may be used by a CR base station in the CR environment; and
a control unit to control a communication of the CR environment to be performed according to the calculated maximum transmission power value.

11. The apparatus as claimed in claim 10, wherein the control unit:
divides the CR environment into a first sector that uses a first channel and a second sector that uses a second channel;
controls the communication of the CR environment to be performed within the calculated maximum transmission power value in the first sector only when the first channel is the same channel used by the incumbent user; and
controls the communication of the CR environment to be performed within the calculated maximum transmission power value in the second sector only when the second channel is the same channel used by the incumbent user.

12. The apparatus as claimed in claim 10, wherein the calculation unit calculates the maximum transmission power value according to an equation:

$$P \leq \left(10^{\frac{SNR_{margin}}{10}} - 1\right)\sigma_1^2 d_2^{\alpha_2},$$

where $SNR_{margin}$ is a difference between a signal-to-noise ratio in a boundary area of a decodable zone based on an incumbent base station, and a signal-to-noise ratio in a boundary area of a protected zone based on the incumbent base station, $\sigma_1^2$ is a noise power of the incumbent base station, and $d_2^{-\alpha_2}$ is a path loss function from the incumbent base station to a CR user.

13. The apparatus as claimed in claim 10, wherein the control unit controls the communication of the CR environment to be performed within the calculated maximum transmission power value.

14. The apparatus as claimed in claim 10, wherein the signal quality information is a signal-to-noise ratio.

15. The apparatus as claimed in claim 10, wherein the control unit ends a communication of a CR user with the CR base station when the CR user does not receive a signal from the CR base station.

16. The apparatus as claimed in claim 10, wherein the control unit attempts to retrieve another channel, different from the same channel used by the incumbent user, for a CR user when the CR user does not receive a signal from the CR base station.

17. A CR base station that communications with a CR user in a CR environment, the CR base station comprising:
a sensing unit to sense an incumbent user that uses a same channel as the CR environment;
a receiving unit to receive signal quality information, detected by the CR user, of the incumbent user;
a calculation unit to calculate, using the received signal quality information, a maximum transmission power value that corresponds to a maximum transmission power that may be used by the CR base station; and
a control unit to control a communication of the CR environment to be performed according to the calculated maximum transmission power value.

18. The CR base station as claimed in claim 17, wherein the control unit:
divides the CR environment into a first sector that uses a first channel and a second sector that uses a second channel;
controls the communication of the CR environment to be performed within the calculated maximum transmission power value in the first sector only when the first channel is the same channel used by the incumbent user; and
controls the communication of the CR environment to be performed within the calculated maximum transmission power value in the second sector only when the second channel is the same channel used by the incumbent user.

19. The CR base station as claimed in claim 17, wherein the calculation unit calculates the maximum transmission power value according to an equation:

$$P \leq \left(10^{\frac{SNR_{margin}}{10}} - 1\right)\sigma_1^2 d_2^{\alpha_2},$$

where $SNR_{margin}$ is a difference between a signal-to-noise ratio in a boundary area of a decodable zone based on an incumbent base station, and a signal-to-noise ratio in a boundary area of a protected zone based on the incumbent base station, $\sigma_1^2$ is a noise power of the incumbent base station, and $d_2^{-\alpha_2}$ is a path loss function from the incumbent base station to a CR user.

20. The CR base station as claimed in claim 17, wherein the control unit controls the communication of the CR environment to be performed within the calculated maximum transmission power value.

21. The CR base station as claimed in claim 17, wherein the signal quality information is a signal-to-noise ratio.

22. A method of determining a transmission power of a CR environment, the method comprising:
sensing an incumbent user that uses a same channel as the CR environment;
obtaining signal quality information of the incumbent user that uses the same channel as the CR environment;
calculating, using the signal quality information, a maximum transmission power value that corresponds to a maximum transmission power that may be used by a CR base station in the CR environment; and
controlling a communication of the CR environment to be performed within the calculated maximum transmission power value.

23. The method as claimed in claim 22, wherein the obtaining of the signal quality comprises:
receiving the signal quality of the incumbent user from a CR user of the CR environment.

24. The method as claimed in claim 22, wherein the calculating of the maximum transmission power value comprises:
calculating the maximum transmission power value according to an equation:

$$P \leq \left(10^{\frac{SNR_{margin}}{10}} - 1\right)\sigma_1^2 d_2^{\alpha_2},$$

where $SNR_{margin}$ is a difference between a signal-to-noise ratio in a boundary area of a decodable zone based on an incumbent base station and a signal-to-noise ratio in a boundary area of a protected zone based on the incumbent base station, $\sigma_1^2$ is a noise power of the incumbent base station, and $d_2^{-\alpha_2}$ is a path loss function from the incumbent base station to a CR user.

25. The method as claimed in claim 22, wherein the signal quality information is a signal-to-noise ratio.

* * * * *